United States Patent [19]

Engesland

[11] E Re. 31,266

[45] Reissued Jun. 7, 1983

[54] APPARATUS FOR GAS COLLECTION IN ALUMINUM SMELTING FURNACES

[75] Inventor: Arne Engesland, Mosjoen, Norway

[73] Assignee: Lista Og Mosjoen Aluminiumverk, Elkem Aluminum A/S & Co., Oslo, Norway

[21] Appl. No.: 53,530

[22] Filed: Jun. 28, 1979

Related U.S. Patent Documents

Reissue of:

[64] Patent No.: 4,033,846
Issued: Jul. 5, 1977
Appl. No.: 613,900
Filed: Sep. 16, 1975

[51] Int. Cl.[3] ..... C25C 3/08; C25C 3/22

[52] U.S. Cl. ..... 204/247; 204/243 R

[58] Field of Search ..... 204/243 R-247, 204/67

[56] References Cited

U.S. PATENT DOCUMENTS

| | | | |
|---|---|---|---|
| 3,470,075 | 9/1969 | Johnson | 204/247 X |
| 3,673,074 | 6/1972 | Hirt et al. | 204/247 X |
| 3,714,002 | 1/1973 | Kibby | 204/247 X |
| 3,912,615 | 10/1975 | Minchenko | 204/243 R |
| 3,935,090 | 1/1976 | Petrusenko et al. | 204/243 R |

FOREIGN PATENT DOCUMENTS

| | | | |
|---|---|---|---|
| 2263348 | 7/1974 | Fed. Rep. of Germany | 204/247 |
| 269494 | 7/1970 | U.S.S.R. | 204/247 |

*Primary Examiner*—Donald R. Valentine
*Attorney, Agent, or Firm*—Eyre, Mann, Lucas & Just

[57] ABSTRACT

A gas collection apparatus for use in electrical smelting furnaces, especially those for the production of aluminum is disclosed. The apparatus comprises a substantially annular body positioned beyond the outer circumference of the furnace at its lower edge and tapering towards the anode carrier at its upper edge. A space at the bottom is left between the wall of the gas collection apparatus and the furnace to permit introduction of air resulting in a chimney effect in the gas collecting apparatus of the present invention.

4 Claims, 3 Drawing Figures

APPARATUS FOR GAS COLLECTION IN ALUMINUM SMELTING FURNACES

Matter enclosed in heavy brackets [ ] appears in the original patent but forms no part of this reissue specification; matter printed in italics indicates the additions made by reissue.

The present invention relates to electrical smelting furnaces and in particular to a gas collection system therefor.

Furnaces for the melt electrolytic production of metals are well known in the art. These furnaces are usually equipped with a permanent iron casing through which an electrode can be introduced into the operative part of the furnace. The electrode establishes a current through the charge thereby melting it and the electrode is gradually consumed during the smelting process. As it is consumed it is lowered into the charge.

During the smelting process, there are a considerable amount of furnace gases produced. These furnace gases are generally collected in a gas collection ring which surrounds the electrode at the bath surface. An alternative or additional means of collection is to have an annular body about the circumference of the furnace pot to collect the gases. In both of the above instances, the wall of the gas collecting member rests on the crust which is formed on the bath surface. In order to prevent undesirable escape of gases, there is usually employed sealing means such as granular aluminum oxide between the lower portion of the gas collecting member and the crust. It is quite important to have a good seal since the gases which are produced will frequently include CO, tar fumes, fluorine vapors and dust, all of which are detrimental to the environment and to the working conditions of the employees in the plant.

While the aforementioned procedure for collecting gas has been in use for a great number of years and works quite well, there are, unfortunately, drawbacks to this system which are especially important in larger plants. One of the drawbacks is that when the crust is broken from time to time to allow for supply of additional material to the charge, the gas collecting member will frequently become open thus permitting the escape of noxious gases and dust mentioned previously. This breaking of the crust can also take place at other times such as when anode effect occurs, i.e., when the contents of the molten bath has been reduced to such a low level that the voltage across the bath is raised thereby causing disruption of the crust. This action will frequently result in the release of the noxious gases and dust into the pot room.

A further problem with this arrangement is that the layer of sealing material used on the surface of the crust, e.g., aluminum oxide, is never completely gas tight and this can lead to the release of gases, especially along the lining of the furnace pot.

In accordance with the present invention, the disadvantages of these known gas collecting systems are substantially eliminated by a gas collecting member which is positioned beyond the circumference of the pot at its lower portion and partly closes the furnace in order to obtain a chimney effect so that gases are drawn upwards within the gas collection enclosure. The hot fluorine and tar containing gases will thus be conducted upwards above the lower work level and the gases will be prevented from escaping into the working area of the furnace operators. At the same time, the gas collection apparatus of the present invention helps to protect against heat radiation from the furnace into the working area thus reducing the undesirably high working temperatures which are normally associated with electric smelting furnaces.

The lower end of the gas collecting apparatus of the present invention is spaced from the wall of the furnace pot thus permitting the entry of air therebeneath. The gas collecting apparatus then tapers towards the anode holder but is spaced from the anode holder sufficient distance so that gases and the like rising in the gas collecting apparatus can escape through the top thereof. Suitable collection apparatus such as ducts or the like may be provided at the top for collection of the escaping gases if desired.

An important feature of the present invention is that it comprises at least two sections, one above the other, each of which is movable with respect to the other. This is preferably done with two sections, which are either articulated or slidable with respect to each other. This construction permits access for breaking of the crust, tapping, service of the burner or the like in connection with the lower portion of the gas collecting apparatus and refilling of the anode paste, stud pulling, jack slipping and the like with respect to the upper portion of the gas collecting apparatus.

These and other features of the present invention may be more fully understood with reference to the drawings wherein.

Figure 1:
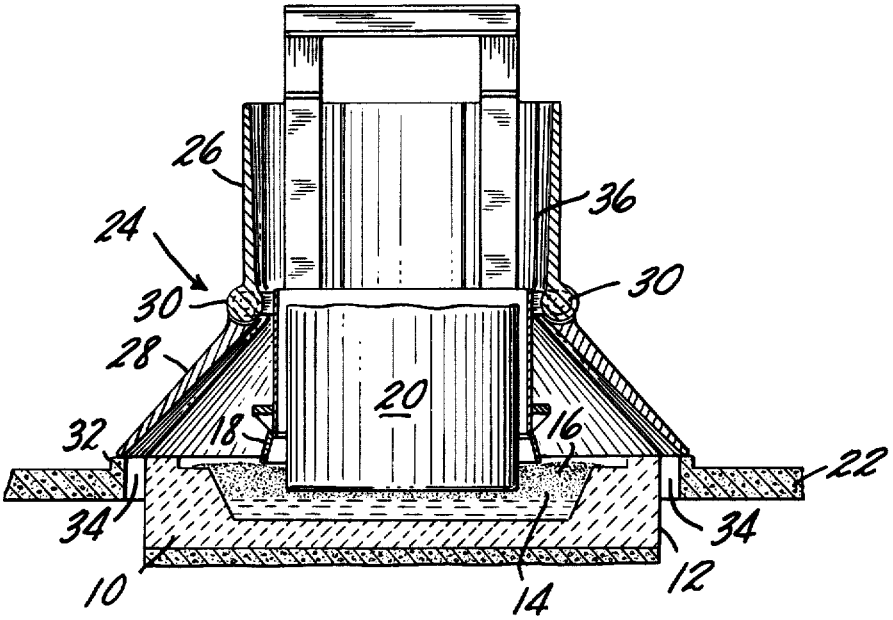
FIG. 1 shows partly in cross section one form of embodiment of the gas collecting apparatus of the present invention.

Referring now to FIG. 1 there is shown a furnace 10 with a substantially annular outer wall 12 and charge 14 with crust 16 at the top thereof. The primary gas collection apparatus 18 surrounds the anode 20. Floor 22 surrounds the furnace 10. In accordance with the present invention, gas collection apparatus 24 is used in addition to primary gas collection apparatus 18. In this embodiment the gas collection apparatus comprises upper member 26 and lower member 28 articulated at 30. The lower member 28 rests on a ridge 32 of the floor 22. A space 34 is provided between the outer wall 12 of the furnace and the floor 22 to permit the free entry of a draft from the basement (not shown) of the furnace. While this is the preferred form of embodiment, it is also possible to eliminate space 34 by positioning member 28 above the floor 22 so that an opening along the floor to act as a draft entrance way is provided. The lower member 28 extends from beyond the wall 12 of the furnace 10 in a sloped position to articulated joint 30 which is spaced from but closely adjacent the anode 20. Extending upwardly from the articulated joint in substantially vertical direction is member 26. As gases are released from the charge 14 they will tend to rise. Due to the opening 34 or similar opening there will be a natural chimney effect which will lift the gases through channel 36 between anode member 20 and upper portion 26 so that the gases are carried away from the furnace room and the operator. At the same time, due to the lower member 28, the gases and radiated heat will also be prevented from escaping into the operating room. Further gas collecting apparatus such as a hooded exhaust fan could be provided above members 26 if desired to collect the gases which escape from the furnace.

Figure 2:
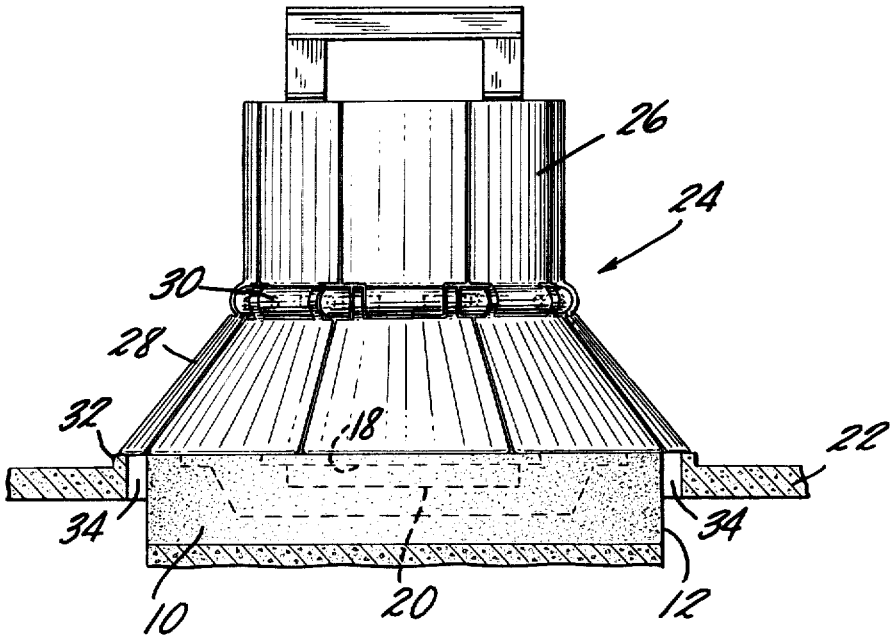
FIG. 2 is a side view of the apparatus of FIG. 1 showing the preferred shape of the upper and lower sections of the gas collection apparatus.

Members 26 and 28 are movable independent of each other to permit accessibility to the appropriate part of the furnace on an as needed basis and for the purposes as described hereinbefore. Lower member 28 and upper member 26 preferably comprise a series of adjacent plates forming substantially an annulus about the furnace 10. While the plates may be straight if desired, it is preferred for best operation that they have an appropriate curvature and it is further preferred that lower members 28 be in the form of truncated triangles in order to insure a gas tight fit and proper functioning of the apparatus, see especially FIG. 2.

Figure 3:
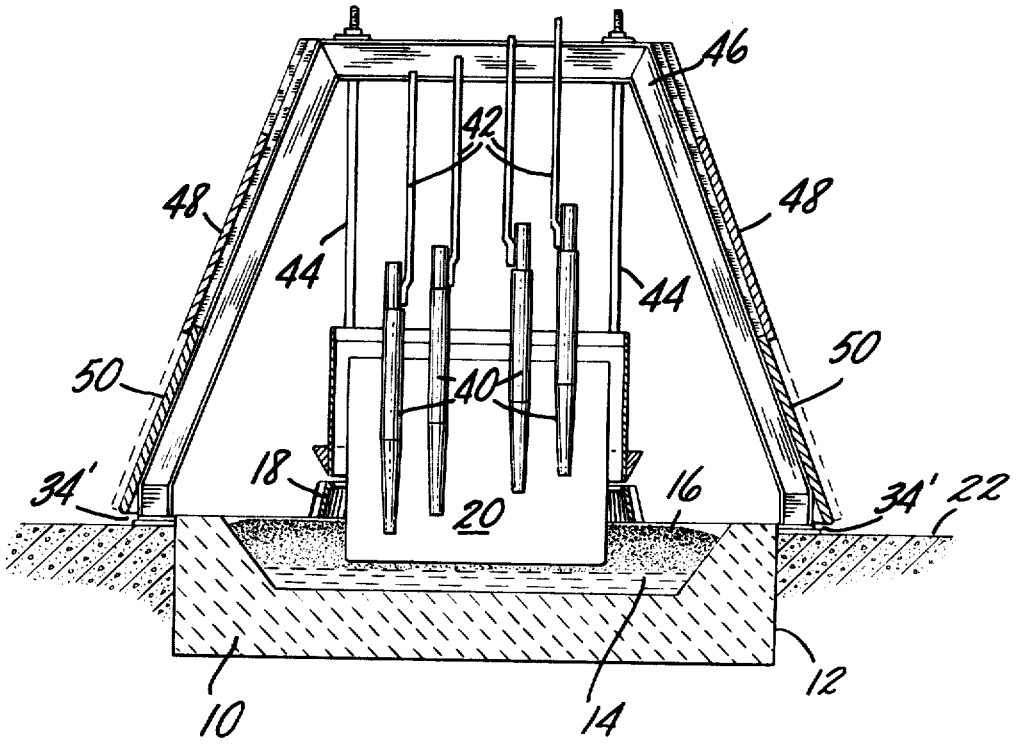
FIG. 3 shows in cross section an alternative embodiment of the gas collection apparatus of the present invention.

In FIG. 3 there is again shown the furnace 10 with outer wall 12 and floor 22, charge 14 with crust 16 and primary gas collection apparatus 18. In this case in the anode section 20 are shown a plurality of electrodes 40 suspended by rods 42. The anode section itself 20 is suspended by rods 44 from an anode frame 46. The upper and lower sections 48 and 50 of the gas collection apparatus are slidable with respect to each other on the anode frame 46. As with the embodiment of FIG. 1, a space 34' is provided below member 50 for the introduction of air necessary for the chimney effect of the gas collection apparatus of the present invention.

The upper section 48 can be moved downwards for access while the lower section 50 can correspondingly be moved upwards. In this embodiment sections 48 and 50 preferably have the shape of lower sections 28 of FIG. 2 and are suitably movable in outward direction with respect to each other in addition to being slidable up and down so that adjacent panels do not interfere with each other when access is desired.

In order to insure proper gas collection, it is essential that the lower member 28 or 50 of the gas collection apparatus be sloped with respect to the vertical. The slope may range from a minimum of about 10° to a maximum of about 60°.

It will be understood that the claims are intended to cover all changes and modifications of the preferred embodiment of the invention, herein chosen for the purpose of illustration, which do not constitute departures from the spirit and scope of the invention.

What is claimed is:

1. In an electric smelting furnace for the melt electrolytic production of aluminum including a furnace [post] *pot* having an [annular] outer side wall and [generally cylindrical] anode section disposed above the furnace pot and being of lesser [diameter] *dimensions* than the [diameter] *dimensions* of the furnace pot the improvement comprising [an annular] *a* gas collecting hood, said gas collecting hood comprising upper and lower portions each of which comprises a plurality of sections and each plurality of sections in combination forming [an annular] *a closed* shape and each said section of each plurality of sections being movable with respect to any other section independently of the other to permit access to said furnace pot, each of said sections in the lower portion having a slope upwardly towards the anode section and the lower end of the lower portion being of greater [diameter] *dimensions* than the [diameter] *dimensions* of the outer wall of the furnace pot and being spaced [radially] outward from the outer wall of the furnace pot to permit entry of air, the upper portion being disposed at least in part [radially] outward from the anode section and being spaced along its length from the anode section to permit upward egress of gases evolved from the smelting process.

2. The apparatus of claim 1 wherein the sections of the upper and lower portions are articulated.

3. The apparatus of claim 1 wherein the sections of the upper and lower portions are slidable with respect to each other.

4. The apparatus of claim 1 wherein each lower section is in the shape of a truncated triangle.

* * * * *